Aug. 29, 1967 A. L. McGEE 3,338,020
METHOD FOR MAKING LINED CONTAINERS
Filed June 17, 1965

United States Patent Office 3,338,020
Patented Aug. 29, 1967

3,338,020
METHOD FOR MAKING LINED CONTAINERS
Arthur L. McGee, San Jose, Calif., assignor to FMC Corporation, Philadelphia, Pa., a corporation of Delaware
Filed June 17, 1965, Ser. No. 464,711
5 Claims. (Cl. 53—27)

The present invention relates to a method for making reinforced plastic lined containers.

Foil-fiber cans have received wide acceptance in many areas, and particularly the oil industry which requires a light weight, disposable and comparatively inexpensive container for oil consumer products. These cans generally have metal lids attached to the ends of a tubular body which consists of spirally wound inner and outer laminations of aluminum foil and kraft paper and a central layer of kraft board. Regardless of the care employed during manufacture, leakage often occurs along the spiral seams of foil-fiber cans, especially after such cans have undergone some jolting as might normally be expected during transit. While such cans are generally less expensive than all metal cans the foil-fiber cans do employ costly materials, such as aluminum lids, and must undergo a relatively large number of manipulative steps during fabrication and filling. Accordingly, a primary object of this invention is to provide an improved and more satisfactory method for making plastic-lined containers.

Another object is the provision of an improved method for making a container having a close fitting, continuous or unbroken and seamless plastic liner which is retained in position without the use of adhesives.

Still another object is the provision of a method for making a container having a generally rigid tubular body which imparts strength to the container and a seamless plastic liner which extends along the inside wall of the tubular body and across one end thereof where it is attached to a container lid.

A further object is the provision of an improved method for making a reinforced plastic-lined container which is strong but light in weight, simple in construction, easily disposed of after use and is made of inexpensive materials.

A still further object is the provision of a simple method of making containers having a liner which is formed in position, so as to fit closely to the container walls, and is bonded to at least one lid thereof.

Still further objects will appear from the following description.

The novelty of the container made by the method of the present invention resides in the manner by which a seamless and continuous or unbroken plastic liner cooperates with a generally rigid supporting tubular shell and an end lid so as to be mechanically locked in a taut and substantially fixed position. More particularly, the lid is disposed across and bears against one end of the shell without being directly attached or adhered thereto. This lid, however, is bonded to the plastic liner which extends along the inside walls of the shell and across said one end.

At its open end the liner includes an integral and continuous lip which projects outwardly over and against the adjacent edge of the shell but is not adhered thereto. The liner lip and the end lid to which the liner is bonded thus cooperate together to lock the plastic liner against any substantial longitudinal movement relative to the shell. Moreover, the plastic liner serves to retain the container end lid in position against the shell, while the liner lip facilitates a good seal between the liner and a subsequently applied top lid or cover and permits such top lid to be bonded in place.

In the practice of the method of the present invention, a lid is positioned adjacent to but slightly spaced from one end of a tubular supporting shell and a sheet of thermoplastic material is disposed across and clamped against the opposite end of such shell. The thermoplastic material is softened by heat and is vacuum formed, with a plug assist, against the walls of the shell and the end lid as a seamless and continuous or unbroken liner. During this operation the end lid is also heated to thermally bond the same to the portion of the plastic liner with which it is engaged. The formed plastic liner and lid are then cooled. The plastic liner is not adhered to the shell and will normally undergo slight shrinkage upon cooling which is generally sufficient to draw the attached lid snugly up against the adjacent edge of the shell. As a result, the plastic liner is free of any crimps or folds and is snugly locked against movement relative to the supporting shell.

Of particular interest in the method of the present invention is that the applied vacuum removes air from within the shell through the small space provided between shell and lid and, in addition draws the heated plastic liner toward this space without disturbing the unbroken continuity of the liner. Thus, in the finished container the plastic liner is supported along substantially all areas thereof.

If desired the lined container made by the method of the present invention may be filled and covered before being removed from the forming apparatus. In this instance the clamp holding the thermoplastic material against the edge of the shell is heated to enable the lip of the plastic liner to bond to an applied heated top lid.

As heretofore mentioned the tubular supporting shell is of generally rigid construction and may be formed of plastic, metal or laminated layers of fibrous materials.

The container liner may be formed of any suitable thermoplastic material which can be heated to its forming temperature without causing damage to the shell or container lids. Polyethylene and polypropylene films, for example, are satisfactory. From the standpoint of simplicity and ease of manufacture, the thermoplastic material may be provided in the form of precut or preformed disks which can be properly clamped to the edge of the shell yet necessitate no subsequent trimming.

The container lids may also be formed from a variety of materials, such as paper or metal and preferably of thermoplastic materials. The liner and lids need not be of the same plastic material, although such a selection would simplify operating procedures and conditions. The lids must be sufficiently large so as to bear against the ends of the supporting shell and are preferably of cup-shape so as to fit over the ends of such shells. If desired, the lids may be shaped with a central crown which extends into and reinforces the end of the shell.

For the sake of simplicity, the method of the present invention is hereafter described as employed in making a container having a tubular shell formed of laminated fibrous materials and a seamless and continuous or unbroken liner and end lids formed of polypropylene.

Figure 1:
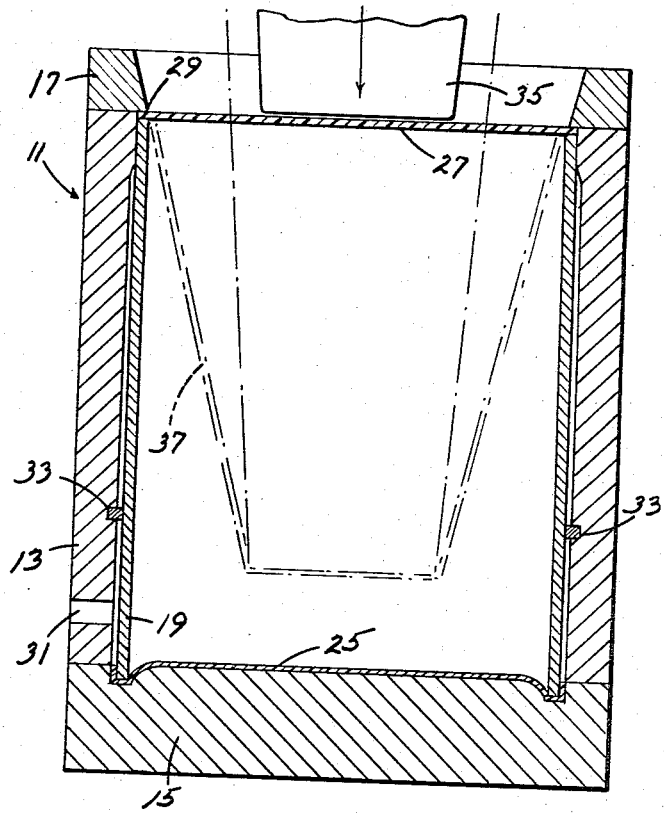
FIGURE 1 is a vertical section through a vacuum forming apparatus illustrating the positions of various parts which are employed in making the container by the method of the present invention.

With reference to the drawing, the method of the present invention is practiced using a vacuum forming apparatus 11 which includes a conventional split tube clamp 13, a mandrel 15 and a top clamp 17. Both the mandrel 15 and top clamp 17 are heated by suitable means, not shown. A tubular shell 19 formed of laminated layers of fibrous material is fixed within the clamp 13 with a small space 21 being provided between the bottom edge 23 of the shell 19 and a lid 25 carried by the mandrel 15. A preformed disk 27 is then firmly gripped between the top edge 29 of the shell 19 and the clamp 17. The lid 25 and disk 27 are preferably formed of the same thermoplastic material, which for the sake of description, may be polypropylene.

Before the actual forming operation is started the lid 25 and disk 27 are heated to about 300° F., which is the forming temperature for polypropylene, by heating the mandrel 13 and clamp 17 and, if necessary, by radiant heaters. Air is evacuated from within the shell 19 through the space 21 and an opening 31 on the split clamp 13. As shown in FIGURE 1, a seal 33 is provided between the clamp 13 and shell 19 to confine the area which is to be evacuated.

Figure 2:
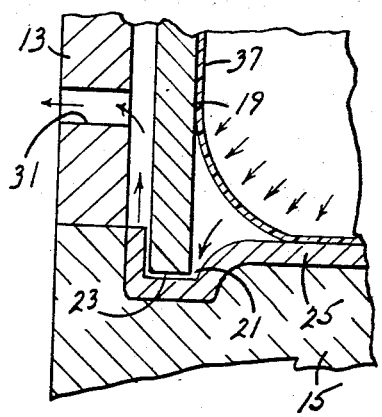
FIGURE 2 is a fragmentary view of a portion of the apparatus shown in FIGURE 1 and showing the positions of the various container parts during a vacuum forming stage of the method of the present invention.

Concomitantly with or perhaps in advance of the vacuum application, a conventional heated plug 35 is engaged with the exposed surface of the heated disk 27 and assists in stretching the same into the form of a seamless and continuous or unbroken liner, as shown at 37 in FIGURE 1. As the evacuation of the shell 19 is being completed, as shown in FIGURE 2, the pressure of the atmosphere on the exposed side of the liner urges the same well into the existing corner between the shell and lid 25. In general, the liner will be of gradually reduced thickness in the area adjacent to the top clamp 17, and will conform with the inside wall of the shell 19 with which it engages. When engaged with the heated lid 25, however, the liner will not only conform with the surface thereof but will bond thereto and provide an integral and relatively thick container bottom wall.

Figure 3:
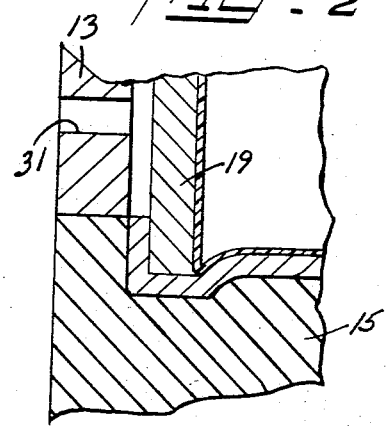
FIGURE 3 is a view similar to FIGURE 2 showing the various container parts at the completion of the vacuum forming stage.
Figure 4:
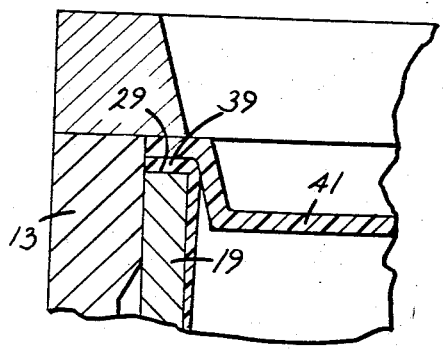
FIGURE 4 is also a fragmentary view of a portion of the apparatus shown in FIGURE 1 illustrating the application of a container top lid.

The mandrel 15 and top clamp 17 are now cooled to set the liner 37 in its expanded shape. The liner 37 will undergo a slight amount of shrinkage during cooling and will thereby draw the lid 25 snugly up against the bottom edge 23 of the shell 19. At its opened end, the liner 37 includes an outwardly projecting, continuous lip 39 which bears against the top edge 29 of the shell 19. It will be apparent that in the finished container the snug engagement of the lid 25 and liner lip 39 with the opposite edges of the shell 19 prevent movement of the liner longitudinally of the shell, and as a practical matter will prevent any liner movement. The liner 37 presents a smooth seamless and continuous or unbroken surface which is free of crimps or folds and, as shown in FIGURE 3, is supported along all areas and particularly along the corners thereof.

The lined contained may now be removed from the forming apparatus or alternatively may be filled and sealed while it remains in place. In this latter instance, the top clamp 17 is maintained hot so that the liner lip 39 is at its forming temperature when a top lid 41 is subsequently applied. The top lid 41 is preferably formed of polypropylene and is also heated by suitable means, not shown, to secure a good bond between the liner 37 and lid 41.

It is to be understood that changes and variations may be made without departing from the spirit and scope of the present invention.

I claim:

1. A method of making plastic lined containers including the steps of positioning a lid across one end of a generally rigid tubular shell which is open at its opposite ends, heating said lid, disposing a sheet of thermoplastic material across the end of said shell which is opposite to said one end and holding the same snugly against the adjacent edge of said shell, softening said sheet by heat and causing the same to move into said shell and toward said lid to thereby form a liner along the inside wall of said shell and bond the same with said heated lid, and cooling said lid and liner, said liner being free of said shell and being retained therein by said lid and the portion of the thermoplastic sheet engaged with the edge of said shell.

2. A method of making plastic lined containers including the steps of positioning a lid formed of thermoplastic material across one end of a generaly rigid tubular shell which is open at its opposite ends, heating said lid to about its forming temperature, disposing a sheet of thermoplastic material across the end of said shell which is opposite to said one end and clamping the same against the adjacent edge of said shell, heating said sheet to about its forming temperature, causing said softened sheet to move into said shell and toward said lid to thereby form a liner which extends along the inside wall of said shell and which bonds with said heated lid, cooling said lid and liner, and releasing the clamped portion of said sheet which remains in place as an outwardly projecting lip, said liner and lid each being unadhered to said shell and being maintained in said shell by said lid and liner lip.

3. A method of making plastic lined containers including the steps of positioning a lid across one end of a generally rigid tubular shell and in slightly spaced relationship therewith, heating said lid, disposing a sheet of thermoplastic material across the end of said shell which is opposite to said one end and clamping the same against the adjacent edge of the shell, heating said sheet to about its forming temperature, evacuating the interior of said shell and causing the softened sheet to form a continuous and seamless liner which extends along the inside of said shell and bonds with said heated lid, cooling said lid and liner whereby the shrinkage of said liner draws the attached lid snugly up against the adjacent edge of said shell, and releasing the clamped portion of said sheet which remains in place as an outwardly projecting lip, said liner and lid each being unadhered to said shell and being maintained in said shell by said lid and liner lip.

4. A method of making plastic lined containers including the steps of positioning a lid formed of thermoplastic material across one end of a generally rigid tubular shell and in slightly spaced relationship therewith, heating said lid to about its forming temperature, disposing a sheet of thermosplastic material across the end of said shell which is opposite to said one end and clamping the same against the adjacent edge of the shell, heating said sheet to about its forming temperature, evacuating the interior of said shell and causing the softened sheet to form a continuous and seamless liner which extends along the inside of said shell and bonds with said heated lid, cooling said lid and liner whereby the shrinkage of said liner draws the attached lid snugly up against the adjacent edge of said shell, and releasing the clamped portion of said sheet which remains in place as an outwardly projecting lip, said liner and lid each being unadhered to said shell and being maintained in said shell by said lid and liner lip.

5. A method as defined in claim 4 further including the step of filling the formed lined container before the clamped portion of the sheet of thermosplastic material is released subsequently heating the liner lip to the forming temperature of the thermoplsatic material and thermally bonding a lid to said heated liner lip.

References Cited

UNITED STATES PATENTS

| | | | |
|---|---|---|---|
| 2,328,798 | 9/1943 | Gardner | 53—27 X |
| 2,736,065 | 2/1956 | Wilcox. | |
| 2,984,056 | 5/1961 | Scholl. | |
| 3,124,915 | 3/1964 | Arneson | 53—27 |
| 3,195,425 | 7/1965 | Taggart | 93—36.01 |

TRAVIS S. McGEHEE, *Primary Examiner.*

GEORGE O. RALSTON, *Examiner.*

N. ABRAMS, *Assistant Examiner.*